Sept. 22, 1970     H. B. WHITMORE     3,530,267
PULSE SENSOR AND TRANSDUCER FOR SMALL MOVEMENTS
Filed Oct. 8, 1968
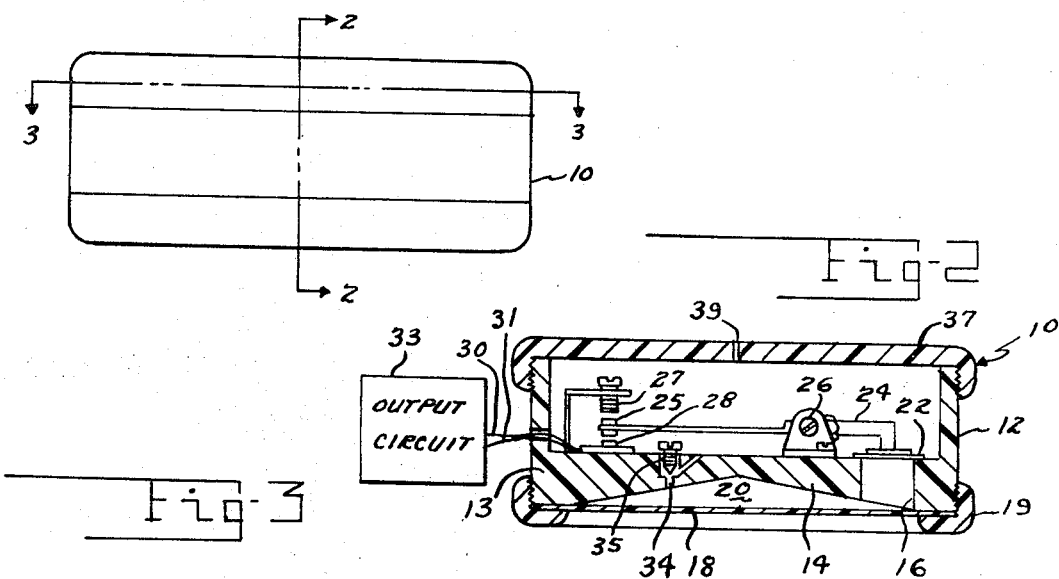
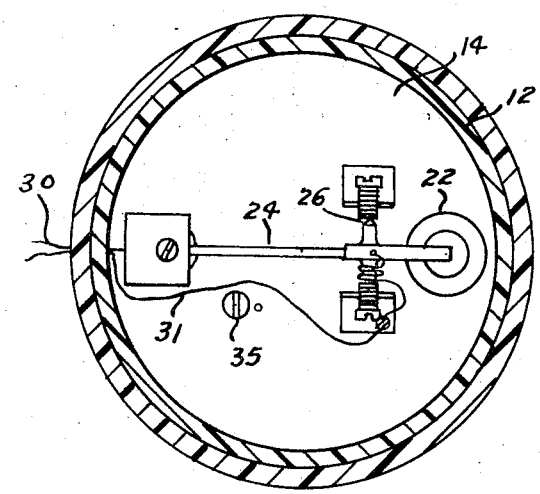
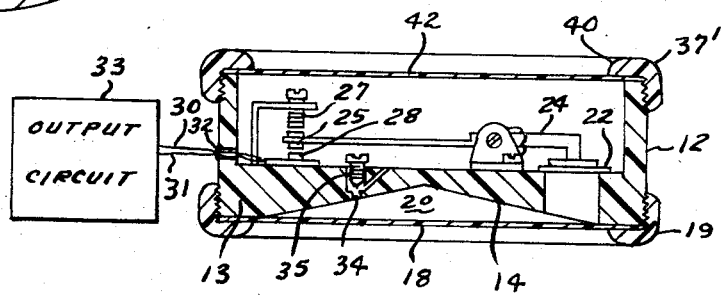
INVENTOR.
HENRY B. WHITMORE though.United States Patent Office 3,530,267
Patented Sept. 22, 1970

3,530,267
PULSE SENSOR AND TRANSDUCER FOR
SMALL MOVEMENTS
Henry B. Whitmore, Rte. 5, Box 369,
San Antonio, Tex. 78211
Filed Oct. 8, 1968, Ser. No. 765,778
Int. Cl. H01h 35/34, 35/40
U.S. Cl. 200—83                                    5 Claims

ABSTRACT OF THE DISCLOSURE

A blood pressure pulse sensor-transducer has a fluent material filled chamber with a sensing diaphragm closing one side of the chamber. The movement of fluent material within the chamber, in response to movement of the diaphram, is used to move a smaller diaphragm to amplify the movement. The smaller diaphragm moves a pivotable contact arm which acts to close a pair of contacts to an external circuit to provide an output signal. An adjustable bypass passage is provided around the small diaphragm for damping low frequencies. In one embodiment the fluent material is air and in a second embodiment the fluent material is a liquid.

BACKGROUND OF THE INVENTION

At present it is very difficult to obtain recordings of small movements produced by blood pressure such as pulse or heart beats in noisy environments. One system which has been used, and which is not entirely satisfactory, is a microphone with filters in the electronic output circuit to remove undesirable high frequencies.

SUMMARY OF THE INVENTION

According to this invention a device is provided which is insensitive to the high frequency noise and which eliminates the need for filters in the electrical output circuit and simplifies the other electrical circuitry.

In the device of this invention a first sensing diaphragm is adapted to be positioned to receive pulse sound movement and to transform the movement into a pressure signal in a pneumatic chamber. A second sensing diaphragm of much smaller diameter than the first diaphragm amplifies the motion and applies the motion signal to a pivotable contact arm. The contact arm has a longer lever arm on the side remote from the second diaphragm to again amplify the motion. The contact arm closes a pair of electrical contacts to an external output circuit. An adjustable pressure exchange port bypasses the second diaphragm to damp out undesirable low frequencies.

BRIEF DESCRIPTION OF THE DRAWING

FIG. 1 is a front elevational view of a blood pressure sensor according to the invention;

FIG. 2 is a sectional view of the device of FIG. 1 along the line 2—2, with the electrical contact mechanism;

FIG. 3 is a sectional view of the device of FIG. 1 along the line 3—3; and

FIG. 4 is a sectional view, similar to the showing in FIG. 2, of a modified blood pressure sensor.

DESCRIPTION OF THE PREFERRED EMBODIMENTS

Reference is now made to FIGS. 1–3 of the drawing, which show a blood pressure pulse sensor 10 having housing member 12 including a support member 13. The support member 13 has a conical identation 14 in one surface and a hole 16 passing through the support. A sensing diaphragm 18, which in the device built was made of X-ray film, is secured to the housing 12 by means of retainer 19, which is threadably secured to the housing member 12. The diaphragm 18 and support member 13 form a pneumatic sensing chamber 20. A second diaphragm 22 is sealed to the support member 13 over the hole 16 with contact cement. An arm member 24, having electrical contacts 25, is made pivotable at 26 and is secured to the diaphragm 22 with contact cement. The contacts 25 are located between stationary contacts 27 and 28. The contact 27 is made adjustable to limit the travel of arm 24. Ouput leads 30 and 31 are connected to the contact 28 and contact arm 24, respectively, and to the output circuit 33. The power supply for providing an output signal will normally be included in the output circuit 33. A separate output lead could be connected to contact 27 to provide a break circuit signal if desired.

An adjustable exchange port 34 is provided in the support member 13 to damp out low frequencies. The flow through the exchange port is controlled by an adjustable screw 35. A cover member 37 is threadably secured to the housing member 13. A vent port 39 is provided in member 37 to allow for pressure change within the housing.

The device thus far described is a pneumatic system but the device can be made to work with liquid instead of air as shown in FIG. 4. This device is the same as the device of FIGS. 1–3 except that the cover member 37' has an opening 40 and holds an exchange diaphragm 42 in the same manner that member 19 holds diaphragm 18. Since liquid is incompressible, movement of diaphragm 42 compensates for the movement of diaphragm 18. In the device built, members 12, 19, and 37 were made of plastic but other materials such as metal could be used. With plastic used for members 12, 19, and 37' and with X-ray film used for diaphragms 18 and 42, it was found that no special seals were required to retain the liquid within the housing of the device of FIG. 4 except for a seal 32, around leads 30 and 31.

In the operation of the device, a movement of diaphragm 18, in response to a movement caused by blood pressure or heart beat, causes a much greater movement of the diaphragm 22. This movement is again amplified by the ratio of the length of the contact arm 24 on the two sides of pivot 26. When one of the contacts 25 engages contact 28, a signal is supplied to the output circuit 33. The output circuit may be a meter or a recorder or any other output circuit desired. The setting of set screw 35 determines the flow through the exchange port 34. It is adjusted to eliminate undesirable low frequencies, but passes the frequencies of interest. The device of the pneumatic embodiment can be adjusted while in operation by removing the cover member 37 or by locating the port 39 over the adjusting screw 35. The device with liquid has to be adjusted with the member 37' and the diaphragm 42 removed.

Though electrical contacts are described for supplying a signal to output circuit 33, other means such as a photocell to sense the position of arm 24 could be used. In such a device the intensity of the light source for energizing the photocell can be varied to adjust sensitivity.

There is thus provided a device for sensing small movements such as produced by blood pressure or heart beat.

While certain specific embodiments have been described, it is obvious that numerous changes may be made without departing from the general principles and scope of the invention.

What is claimed is:

1. A device for sensing small movements produced by blood pressure pulses comprising: means for forming a closed chamber; said means including a sensing diaphragm forming one wall of said chamber; a fluent material within said chamber; means for forming a passage communicating with said chamber; a second diaphragm, having a smaller diameter than said first diaphragm, covering said passage, whereby movement of said sensing diaphragm causes a larger movement of said second diaphragm; means responsive to movement of said second diaphragm, for providing an output responsive to said sensing diaphragm and port means bypassing said diaphragm for making said second diaphragm substantially insensitive to low frequency signals within said chamber.

2. The device as recited in claim 1 wherein said port means includes means for adjusting the flow therethrough.

3. The device as recited in claim 1 wherein said means for providing an output signal includes a pivotable arm having one end attached to said second diaphragm; said pivotable arm having electrical contact at the end remote from said second diaphragm; a stationary contact positioned adjacent the electrical contacts on said arm; lead means, connected to said pivotable arm and said stationary contact, for applying the output of said device to an external circuit.

4. The device as recited in claim 3 wherein said port means includes means for adjusting the flow therethrough.

5. The device as recited in claim 4 wherein said fluent material is air.

References Cited

UNITED STATES PATENTS

| | | | |
|---|---|---|---|
| 2,935,582 | 5/1960 | Northey | 200—83 |
| 2,994,757 | 1/1961 | Flubacker | 200—83 XR |
| 3,029,324 | 4/1962 | Couffer et al. | 200—83 |

ROBERT K. SCHAEFER, Primary Examiner

J. R. SCOTT, Assistant Examiner